United States Patent Office 3,732,219
Patented May 8, 1973

3,732,219
TETRAHYDRO-as-TRIAZINE-3(2H)THIONES
Paul E. Krieger, Indianapolis, Ind., assignor to The Dow Chemical Company, Midland, Mich.
No Drawing. Filed Aug. 30, 1968, Ser. No. 756,412
Int. Cl. C07d 55/10
U.S. Cl. 260—248 AS          7 Claims

ABSTRACT OF THE DISCLOSURE

Substituted tetrahydro-as-triazine-3(2H)thiones are prepared by the reaction of carbon disulfide with a substituted 2-aminoalkylhydrazine such as 1-(2-aminoethyl)-1-propylhydrazine or 1 - (2 - aminobutyl)-1-methylhydrazine. The novel compounds are useful as intermediates in the preparation of substituted thiazolo[3,2-b] and [2,3-c]-as-triazines. The thiazolotriazine compounds have pharmacological activity as antidepressants as indicated by their antagonism of reserpine and their potentiation of amphetamine, and are also useful in potentiation of barbiturates.

CROSS-REFERENCES TO RELATED APPLICATIONS

The tetrahydro-as-triazine-3(2H)thiones of the present invention are useful in the preparation of substituted thiazolo[3,2-b] and [2,3-c]-as-triazines which are disclosed and claimed in a copending joint application by Donald L. Trepanier and the present applicant, entitled "Thiazolo-as-Triazines," Ser. No. 756,411, filed concurrently herewith and hereby incorporated by reference.

The copending joint application teaches that the present tetrahydro-as-triazine-3(2H)thiones can be reacted with 1,2-disubstituted ethanes such as substituted 1,2-dihaloethanes, 1-halo-2-sulfonyloxyethanes or 1-halo-2-hydroxyethanes to prepare substituted 2,3,6,7-tetrahydro-5H-thiazolo[3,2-b] - as - triazines or with 1,2 - disubstituted ethanes such as substituted 1-halo-2-ketoethanes, 1-halo-2-nitriloethanes or 1-halo-2,2-dialkoxyethanes in the production of substituted 3,4-dihydro- and 3,4,5,6-tetrahydro-2H-thiazolo[2,3-c]-as-triazine compounds. The application further teaches that such thiazolotriazines are high boiling liquids or crystalline solids which are useful for administration to animals in the study of the behavior thereof and in the investigation of drug effects on the central and peripheral nervous systems, and that they are particularly useful as antidepressants, as indicated by their potentiation of amphetamine and their antagonism of reserpine. They also can be employed to potentiate the effects of barbiturates.

BACKGROUND OF THE INVENTION

Description of the prior art

The 2-aminoalkylhydrazines employed as starting materials in the present invention are prepared in accordance with known techniques. Trepanier et al., Journal of Medicinal Chemistry, 10, 228 (1967). In such procedures, hydrazine or an alkylhydrazine corresponding to the formula $$R_1-NH-NH_2$$

is reacted with ethyleneimine, 1,2-propyleneimine, 1,2-butyleneimine or 1,2-pentyleneimine corresponding to the formula

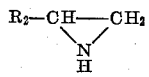

in the presence of a catalytic amount of ammonium chloride. The reaction mixture is heated at the boiling temperature and under reflux for about 24 hours. Thereafter, the excess hydrazine is distilled off and the product separated by fractional distillation.

SUMMARY OF THE INVENTION

This invention is concerned with novel substituted triazinethiones and is particularly directed to substituted 1,4,5,6 - tetrahydro-as-triazine - 3(2H)thione compounds corresponding to the formula:

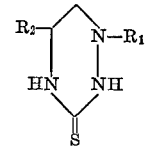

I

Ii the present specification and claims, $R_1$ and $R_2$ each independently represent hydrogen, methyl, ethyl or propyl. For the sake of convenience, the compounds corresponding to Formula I above will be hereinafter referred to as "triazinethiones." The novel triazinethiones are crystalline solids which are, in general, insoluble in water and of varying degrees of solubility in organic solvents such as acetone, ether, benzene and chloroform.

The triazinethiones of the invention are prepared by the reaction of carbon disulfide with a 2-aminoalkylhydrazine corresponding to the formula

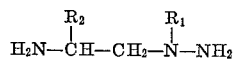

$$H_2N-CH-CH_2-N-NH_2$$

wherein $R_1$ and $R_2$ have the significance above set out with respect to Formula I. The reaction proceeds when the reactants are contacted and mixed, and the reaction is conveniently carried out in an inert organic liquid as reaction medium. Representative inert organic liquids which can be employed as reaction media include ethanol, methanol, isopropanol, water and mixtures thereof.

The reaction proceeds readily at a temperature of from about 25° to about 150° C. In a convenient procedure, the reaction is carried out at the boiling temperature of the reaction mixture at or about normal atmospheric pressure and under reflux. The reaction proceeds readily with production of the desired product and hydrogen sulfide of reaction when the reactants are contacted at the reaction temperature in any proportions; however, optimum yield of the triazinethione product is obtained when the 2-aminoalkylhydrazine and carbon disulfide are employed in substantially equimolar proportions, or preferably, with a slight excess of carbon disulfide. The triazinethione product is only sightly soluble in alcohols and the product precipitates in the reaction mixture when an alcoholic reaction medium is employed or when the reaction mixture is diluted with an alcohol. The product is conveniently separated by conventional procedures such as filtration, decantation or centrifugation. The product can be purified by known techniques such as recrystallization and washing.

In preparing the triazinethiones of the present invention, the 2-aminoalkylhydrazine and carbon disulfide are contacted intimately in any order or fashion. In a convenient procedure, the 2-aminoalkylhydrazine is dispersed in an inert organic liquid as reaction medium and the carbon disulfide is added slowly to the mixture with stirring. The temperature of the reaction mixture is maintained at a temperature within the desired reaction temperature range during the addition of the carbon disulfide and for a period of time of from about 2 to 8 hours to complete the reaction. The yield of the triazinethione product is generally increased if an acid which is not detrimentally reactive with the product or starting materials is added to the reaction mixture, preferably after the addition of the carbon disulfide is complete and before the end of the reaction period. Suitable acids which can be employed include hydrochloric, hydrobromic, sulfuric, phosphoric and the like acids. In a preferred procedure, from about 0.1 to about 0.5 mole of a mineral acid is added to the reaction mixture for each mole of carbon disulfide about one to three hours after the addition of carbon disulfide is complete, heating of the reaction mixture being continued for from one to four hours after the addition of the acid. Thereafter, the mixture is cooled, filtered or otherwise separated to obtain the solid product which can be purified by conventional procedures such as recrystallization and washing.

DESCRIPTION OF THE PREFERRED EMBODIMENTS

The following examples are merely illustrative and are not intended to be limiting.

EXAMPLE 1

1-(2-aminoethyl)-1-methylhydrazine (268 grams; 3.0 moles) is dissolved in 1200 milliliters of 50 percent aqueous ethanol and the solution is heated at a temperature of 60° C. To this solution is added dropwise with stirring over a one-hour period carbon disulfide (252 grams; 3.3 moles). The resulting mixture is heated at the boiling temperature and under reflux for two hours. A precipitate forms in the reaction mixture within a few minutes after the mixture attains the boiling temperature. Concentrated hydrochloric acid (25 milliliters) is then added dropwise and the mixture is held at the boiling temperature for an additional three hours. The reaction mixture is held for 18 hours at a temperature of about 45° C. The reaction mixture is cooled, the crystalline solid product is collected as a filter cake by suction filtration of the cooled mixture and the product is washed with cold ethanol, then with diethyl ether. The 1,4,5,6-tetrahydro-1-methyl-as-triazine-3(2H)-thione product is recrystallized from methanol and found to melt at 192°–193° C. The product is found by analysis to have carbon, nitrogen and sulfur contents of 36.9, 31.2 and 24.3 percent, respectively, as compared with the theoretical contents of 36.6, 32.0 and 24.4 percent, respectively, calculated for the named structure. The structure of the product is confirmed by infrared spectroscopy.

In substantially the same procedure as described above, the following triazinethiones are prepared.

5-propyl-1,4,5,6-tetrahydro-as-triazine-3(2H) - thione, having a molecular weight of 159.3, is prepared by reacting together carbon disulfide and (2-aminopentyl)hydrazine in aqueous ethanol.

1-ethyl-1,4,5,6-tetrahydro - as - triazine-3(2H)-thione, having a molecular weight of 145.2, is prepared by reacting together carbon disulfide and 1-(2-aminoethyl)-1-ethylhydrazine in aqueous methanol.

5-methyl-1,4,5,6-tetrahydro-as-triazine-3(2H) - thione, having a molecular weight of 131.2, is prepared by reacting together carbon disulfide and (2-aminopropyl)hydrazine in aqueous ethanol.

EXAMPLE 2

1-(2-aminopropyl)-1-methylhydrazine (309 grams; 3.0 moles) is dissolved in 1000 milliliters of warm (55°–60° C.) aqueous ethanol. The resulting mixture is stirred over a period of two hours, while carbon disulfide (252 grams; 3.3 moles) is added thereto dropwise. A precipitate forms shortly after the addition of the carbon disulfide is complete. The mixture is stirred and heated at the boiling temperature under reflux for two hours. Concentrated hydrochloric acid (25 milliliters) is then added dropwise to the mixture over a twenty-minute period, and the stirring and heating are continued for an additional 1.5 hours. The solution is allowed to stand overnight at room temperature, during which time additional solid precipitates from the mixture. The mixture is filtered and the product is obtained as a filter cake. The 1,4,5,6-tetrahydro-1,5-dimethyl-as-triazine - 3(2H)thione product is washed with ethanol and ether, recrystallized from methanol and found to melt at 225° C. with decomposition. The product is found by analysis to have carbon and hydrogen contents of 41.2 and 7.8 percent, respectively, as compared with the theoretical contents of 41.4 and 7.6 percent, respectively, calculated for the named structure. The structure of the product is confirmed by infrared spectroscopy.

In substantially the same procedure, the following are prepared.

1,5-diethyl-1,4,5,6-tetrahydro-as-triazine - 3(2H)thione, having a molecular weight of 173.3, is prepared by the reaction of 1-(2-aminobutyl)-1-ethylhydrazine with carbon disulfide.

5-methyl-1 - propyl - 1,4,5,6 - tetrahydro-as-triazine-3 (2H)thione, having a molecular weight of 173.3, is prepared by the reaction of 1-(2-aminopropyl)-1-propylhydrazine with carbon disulfide.

EXAMPLE 3

In substantially the same procedure as employed in Examples 1 and 2, carbon disulfide (49 grams; 0.64 mole) is added dropwise to a stirred solution of (2-aminoethyl)hydrazine (52.5 grams; 0.61 mole) in 200 milliliters of aqueous ethanol maintained at a temperature of 65° C. The addition is carried out over a period of about 1.5 hours. The mixture is heated at the boiling temperature under reflux for two hours, after which 5 milliliters of concentrated hydrochloric acid are added over a fifteen-minute period, and the stirring and heating is continued for an additional two hours. The solution is held overnight at room temperature and is then suction filtered. The filter cake is washed twice with cold ethanol and once with ether. The crystalline 1,4,5,6-tetrahydro-as-triazine-3(2H)thione is recrystallized from methanol and found to melt at 163°–164° C. with decomposition. The product is found by analysis to have carbon, hydrogen and nitrogen contents of 30.7, 6.3 and 36.0 percent, respectively, as compared with the theoretical contents of 30.8, 6.0 and 35.9 percent, respectively, calculated for the named structure.

In a representative procedure, the 1-methyl-1,4,5,6-tetrahydro-as-triazine-3(2H)thione of Example 1 (19 grams; 0.14 mole) is mixed with 1-nitrilo-2-phenyl-2-benzenesulfonyloxyethane (39 grams; 0.14 mole) and 400 milliliters of ethanol. The mixture is heated at a temperature of 100° C. for one hour and evaporated in vacuo. The residue is dissolved in chloroform, washed with aqueous sodium carbonate and with water and dried over anhydrous magnesium carbonate. The residue is purified by chromatography on an alumina column using a mixture of ether and chloroform as an eluant. The eluant is evaporated and the residue is triturated with ether and filtered. The filter cake is recrystallized first from a mixture of isopropanol and pentane and then from isopropanol to obtain 3,4-dihydro-2-methyl-7-phenyl-2H-thiazole[2,3-c]-as-triazin-6(7H)one as a crystalline solid melting at 94°–96° C. The above-named thiazolotriazine compound is then administered to mice at various dosage rates between about 10 and about 200 milligrams of test compound per kilogram of animal body weight and the animals are tested in routine pharmacological testing procedures. In such operations, the compound is found to produce increases in hexobarbital sleep time in mice administered 100 milligrams of hexobarbital per kilogram (as compared with untreated check mice) and to produce increases of at least two-fold in sleep time at an ED 50 of 95 milligrams per kilogram. The compound is also found to prevent the symptoms of ptosis, pilo-erection and decreased activity and response to stimuli resulting from the intraperitoneal administration of 5 milligrams of reserpine per kilogram to mice. The compound antagonizes reserpine in such operations at an ED 50 of 61 milligrams per kilogram.

What is claimed is:
1. A compound corresponding to the formula

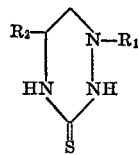

wherein $R_1$ and $R_2$ each independently represent hydrogen, methyl, ethyl or propyl.
2. A compound of claim 1 wherein $R_1$ is hydrogen.
3. A compound of claim 1 wherein $R_1$ and $R_2$ each independently represent hydrogen or methyl.
4. A compound of claim 3 wherein $R_1$ represents hydrogen.
5. A compound of claim 3 wherein $R_2$ represents methyl.
6. A compound of claim 3 wherein $R_1$ represents methyl.
7. A compound of claim 3 wherein $R_2$ represents hydrogen.

References Cited
UNITED STATES PATENTS
3,377,345   4/1968   Trepanier et al. _____ 260—244

JOHN M. FORD, Primary Examiner

U.S. Cl. X.R.
424—249